United States Patent
Mittmann et al.

[19]

[11] Patent Number: 5,952,746
[45] Date of Patent: Sep. 14, 1999

[54] ELECTRICAL MACHINE AND METHOD FOR MOUNTING SUCH ELECTRICAL MACHINE ON A UNIT

[75] Inventors: Hans-Georg Mittmann, Wentdorf; Martin Hinkelmann, Escheburg, both of Germany

[73] Assignee: Still GmbH, Germany

[21] Appl. No.: 09/080,051

[22] Filed: May 15, 1998

[30] Foreign Application Priority Data

May 22, 1997 [DE] Germany .......................... 197 21 528

[51] Int. Cl.⁶ ........................................ H02K 5/04
[52] U.S. Cl. ...................... 310/42; 310/75 R; 310/91; 310/74; 417/423.15
[58] Field of Search .................. 310/74, 78, 79, 310/75 R, 83, 86, 77, 162, 42, 91; 417/423.15

[56] References Cited

U.S. PATENT DOCUMENTS

| | | | |
|---|---|---|---|
| 2,578,837 | 12/1951 | Raney | 310/77 |
| 2,946,906 | 7/1960 | Munck | 310/41 |
| 2,987,637 | 6/1961 | Bertsche et al. | 310/54 |
| 3,215,877 | 11/1965 | Raver et al. | 310/168 |
| 3,539,951 | 11/1970 | Bozsvai | 310/91 |
| 3,763,968 | 10/1973 | Noly | 310/77 |
| 4,170,057 | 10/1979 | Roddy et al. | 29/596 |
| 4,337,406 | 6/1982 | Binder | 310/91 |

FOREIGN PATENT DOCUMENTS

| | | | |
|---|---|---|---|
| 0425182 | 5/1991 | European Pat. Off. | H02K 15/00 |
| 3130640 | 2/1983 | Germany | H02K 7/18 |
| 3301245 | 2/1991 | Germany | H02K 7/18 |
| 0529621 | of 0000 | United Kingdom . | |

Primary Examiner—Nestor Ramirez
Assistant Examiner—B. Mullins
Attorney, Agent, or Firm—Webb Ziesenheim Logsdon Orkin & Hanson, P.C.

[57] ABSTRACT

An electrical machine with a stator and a rotor rotatable about an axis of rotation and having no bearing elements rotatably mounting the rotor relative to the stator or for defining the axis of rotation of the rotor is provided with means for releasably securing the rotor in position relative to the stator. The rotor can be secured relative to the stator in the axial and radial directions. Rotation of the rotor relative to the stator can also be prevented.

22 Claims, 2 Drawing Sheets

ELECTRICAL MACHINE AND METHOD FOR MOUNTING SUCH ELECTRICAL MACHINE ON A UNIT

BACKGROUND OF THE INVENTION

1. Field of the Invention

The present invention concerns an electrical machine with a stator and a rotor rotatable about an axis of rotation and a method of mounting such an electrical machine on a unit, such as an internal combustion engine.

2. Prior Art

Electrical machines in which the rotor is not mounted on a stator housing and in which no bearing elements are provided to secure the rotor in a rotatable manner relative to the stator or to define the axis of rotation of the rotor are known as bearing-free machines. In operation, electrical machines of this type are always connected with a unit, for example an internal combustion engine or a gearbox. In this case the rotor is connected securely to a shaft of the unit by means of which the position of the rotor inside the electrical machine is determined.

In the case of known electrical machines of this type, before being fitted to the unit the rotor can be moved in any direction relative to the stator. In the case of permanently energized electrical machines, usually strong permanent magnets are secured to the rotor. Thus, when the movable rotor comes into contact with a ferromagnetic part of the stator, it is often difficult to release the rotor from the stator due to the strong magnetic force. Preassembly and shipment of such an electrical machine as a complete unit is not possible for this reason. Costly guiding and centering devices are required to fit the electrical machine to the unit.

It is, therefore, an object of the present invention to provide such an electrical machine which can be shipped and installed easily and to provide a suitable method for mounting such an electrical machine to a unit.

SUMMARY OF THE INVENTION

According to one aspect of the present invention, there is provided an electrical machine comprising a stator and a rotor rotatable about an axis of rotation relative to the stator, there being no bearing element for rotatably mounting the rotor relative to the stator or for defining the axis of rotation of the rotor, wherein the electrical machine comprises means for releasably securing the rotor in position relative to the stator.

Thus, for example during shipment and/or during installation, the rotor can be fixed relative to the stator. This allows shipment of the electrical machine in a preassembled state, i.e., with a rotor located inside a stator housing. Also, movement of the rotor relative to the stator can be prevented during installation until the means according to the invention for securing the rotor are released. In practice, the latter only occurs when the rotor is connected adequately securely to a shaft of the unit.

In one embodiment of the invention, the means for releasably securing the rotor in position comprises at least one guide element for securing the rotor against radial movement relative to the stator. In particular with movement of the rotor in the radial direction there is a danger that a permanent magnet of the rotor may come into contact with the stator. This is prevented by securing the rotor in the radial direction.

The guide element may comprise a shoulder. The rotor can be slid onto the shoulder and is thus secured in the radial direction. The shoulder may be provided with an inclined portion for guiding the rotor onto the shoulder.

The means for releasably securing the position of the rotor may comprise at least one securing element for securing the rotor against axial movement relative to the stator. This prevents the rotor from separating from the stator.

Expediently, the securing element may comprise a securing screw. A flange may be provided for additionally securing the rotor against axial movement relative to the stator.

The means for releasably securing the rotor in position may comprise at least one securing element for determining the rotational position of the rotor relative to the stator. Thus, the rotational position of the stator can be preset when the rotor is first fitted into the stator and can remain unchanged during subsequent fitting steps.

According to one embodiment of the invention, a housing of the electrical machine may be connected to the stator and may include a flange for mounting the housing. The electrical machine can be secured to the unit by way of this housing flange.

The rotor may be provided with a drive flange for transmitting rotary motion. The rotor may be connected to the rotatable shaft of the unit with the drive flange.

The drive flange may be adapted to secure the rotor to a crankshaft of an internal combustion engine. With this embodiment, an internal combustion engine is intended as the unit.

In one development of the invention, the drive flange is provided with means for determining the angular position of the rotor relative to a source of rotary motion, such as a crankshaft. A defined angular position determined by the design of the drive flange may be provided for connecting the rotor to a source of rotary motion, such as a crankshaft.

The drive flange may be provided with an asymmetrical hole pattern for securing the drive flange to the source of rotary motion.

The rotor may be adapted to form a flywheel of an internal combustion engine. The values of the mass and the moment of inertia of the rotor can be sufficient for this purpose.

According to one embodiment, a ring gear may be provided on the rotor for meshing with a starter motor of an internal combustion engine.

A pump unit may be located within a housing of the electrical machine. The pump unit may be a coolant pump or a hydraulic pump and may serve for cooling and/or supplying the electrical machine, internal combustion engine or other units.

One embodiment is obtained when the housing of the electrical machine is constructed such that a drive flange of the rotor is accessible after removal of the pump unit. The rotor fitted in the stator can thus be connected to the crankshaft through a corresponding opening in the housing of the electrical machine.

The stator, or a housing for the stator, of the electrical machine may be provided with at least one passage for fluid coolant. While the electrical machine is operating, heat must be removed from the stator winding in particular. The coolant passages are located within the housing in the region of the stator winding.

According to another aspect of the present invention, there is provided a method for mounting an electrical machine on a unit, the electrical machine comprising a stator and a rotor rotatable about an axis of rotation relative to the stator, there being no bearing element for rotatably mounting the rotor relative to the stator or for defining the axis of rotation of the rotor, the method comprising the steps of:

(a) releasably securing the rotor relative to the stator;

(b) rigidly securing the stator to the unit;

(c) connecting the rotor to a rotatable shaft of the unit;

(d) releasing the rotor relative to the stator; and (e) securing the rotor to the rotatable shaft of the unit for use of the electrical machine.

The above steps ensure that the rotor always remains in a predetermined position relative to the stator until substantial completion of the installation. The means for fixing the position of the rotor is released only when the stator of the electrical machine is adequately secured to the unit and the rotor is adequately secured to the rotatable shaft of the unit.

The method may include the additional step of rotating the rotatable shaft of the unit to a predetermined position prior to mounting the electrical machine. The predetermined position may be formed, for example, by a mark for top dead center when an internal combustion engine is intended as the unit.

The stator may be secured to the unit by way of a housing for the electrical machine.

These and other advantages of the present invention will be clarified in the Detailed Description of the Preferred Embodiments wherein like reference numerals represent like elements throughout.

DETAILED DESCRIPTION OF THE PREFERRED EMBODIMENTS

Figure 1:
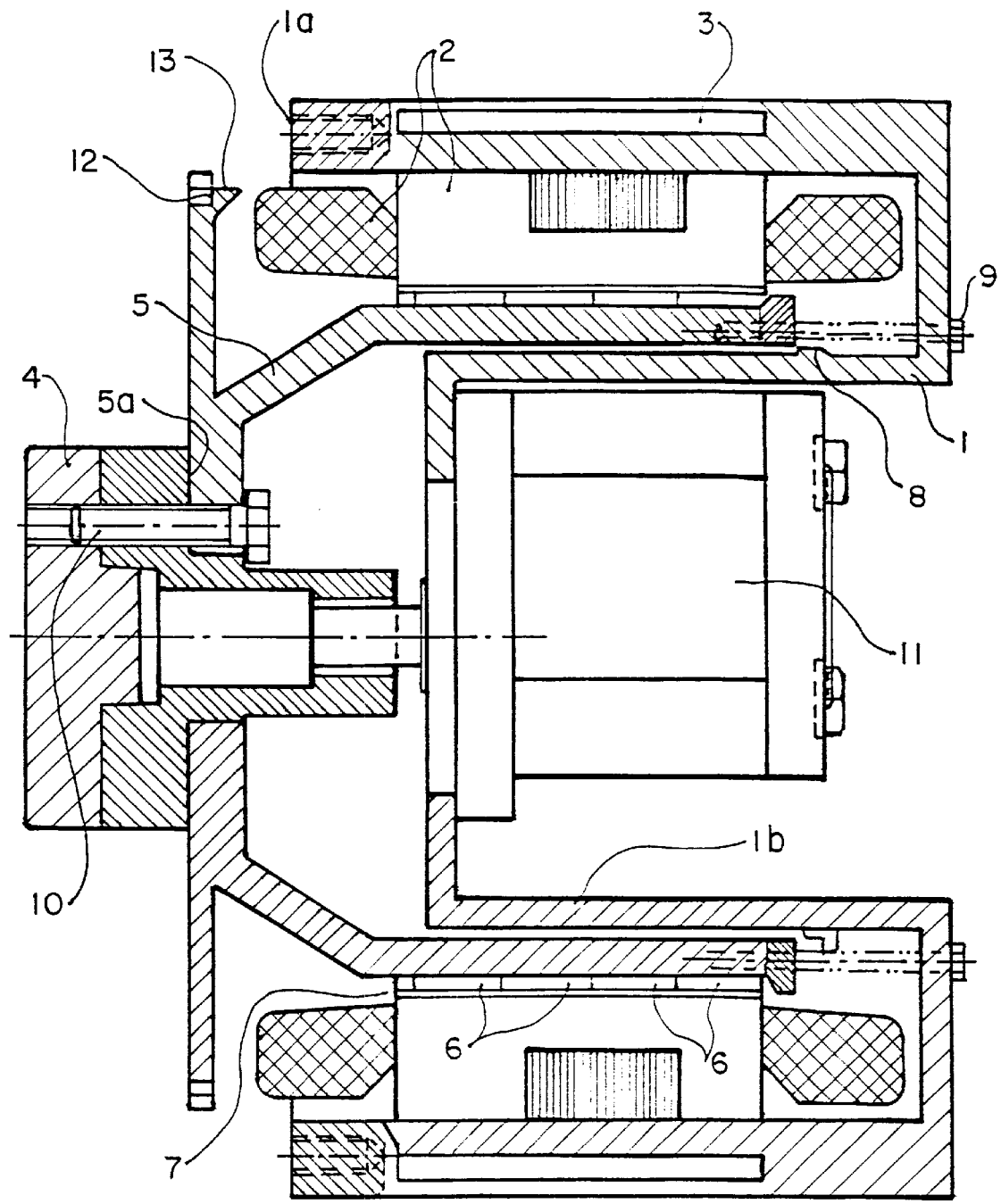
FIG. 1 is a diagrammatic cross-sectional illustration of one embodiment of an electrical machine according to the present invention.

FIG. 1 shows an embodiment of an electrical machine according to the invention in which a housing 1 is connected securely by an outer housing flange 1a to a unit (not shown), in the illustrated example an internal combustion engine. The housing 1 comprises two generally concentric cylindrical members interconnected at one end thereof by a radially extending annular member. A stator 2 of the electrical machine in the form of a stator winding is secured to the inner surface of the outer cylindrical member of the housing 1. Coolant passages 3 are disposed in the housing 1 in the region of the stator 2 and fluid coolant flowing through the coolant passages 3 conducts heat away from the stator winding in particular.

A generally cylindrical rotor 5 of the electrical machine is secured to a rotatable shaft of the internal combustion engine, in the illustrated example the crankshaft 4. The rotor 5 projects into the housing 1 between the inner and outer generally cylindrical members, whereby permanent magnets 6 secured to the rotor 5 are separated from the stator 2 by an air gap 7.

Thus, the connection of the electrical machine to the internal combustion engine defines firstly the position of the housing 1 and secondly the position of the rotor 5. Here, the size of the air gap 7 is such that regularly occurring positional tolerances of the crankshaft 4 of the internal combustion engine do not lead to a collision between the rotor 5, or the permanent magnets 6, and the stator 2.

However, likewise, it is important to prevent the permanent magnets coming into contact with the stator during preassembly of the electrical machine itself or during connection of the electrical machine to the internal combustion engine. To this end, according to the invention the electrical machine is provided with means for releasably securing the rotor in position relative to the stator. These means are provided by an annular shoulder 8 which is formed around a cylindrical wall of the housing 1 and onto which the rotor 5 can be mounted by a sliding movement. To facilitate mounting of the rotor 5 on the shoulder 8, that side of the shoulder 8 adjacent the rotor 5 is inclined to allow an initial freedom of movement of the rotor in the radial direction, while that side of the shoulder remote from the rotor 5 is provided with a protruding flange for restricting axial movement of the rotor 5. In addition, securing screws 9 are provided which retain the rotor against the flange of the shoulder 8 and prevent the rotor 5 from sliding off the shoulder 8. The rotor is, therefore, fixed in the axial and radial directions and prevented from pivoting by the flanged shoulder 8 and the securing screws 9.

When the electrical machine is fitted to the internal combustion engine, first the housing 1 is screwed to the internal combustion engine by way of the housing flange 1a. During this process the rotor 5, which is still retained on the shoulder 8 at this point, is automatically centered on the crankshaft 4. The securing screws 9 can now be released. The rotor 5 is pulled off the shoulder 8 and simultaneously secured to the crankshaft 4 by uniformly tightening screws 10 provided through a drive flange 5a. Contact between the permanent magnets 6 and the stator 2 is prevented in the process.

During this fitting operation the tightening screws 10 are accessible through an opening formed in an end of the inner cylindrical member 1b of the housing 1. A pump unit 11, which is also connected to the crankshaft 4, is arranged within the inner cylindrical member 1b. The rotor 5 functions as a flywheel for the internal combustion engine and is provided with a ring gear 12 for meshing with a starter motor and with a mark 13 for indicating the top dead center of the internal combustion engine.

In the illustrated embodiment, the electrical machine is in the form of an internal rotor alternator. A version of the electrical machine in the form of an external rotor machine and/or motor is also possible. The pump unit 11 is intended to function as a coolant pump or a hydraulic pump.

Figure 2:
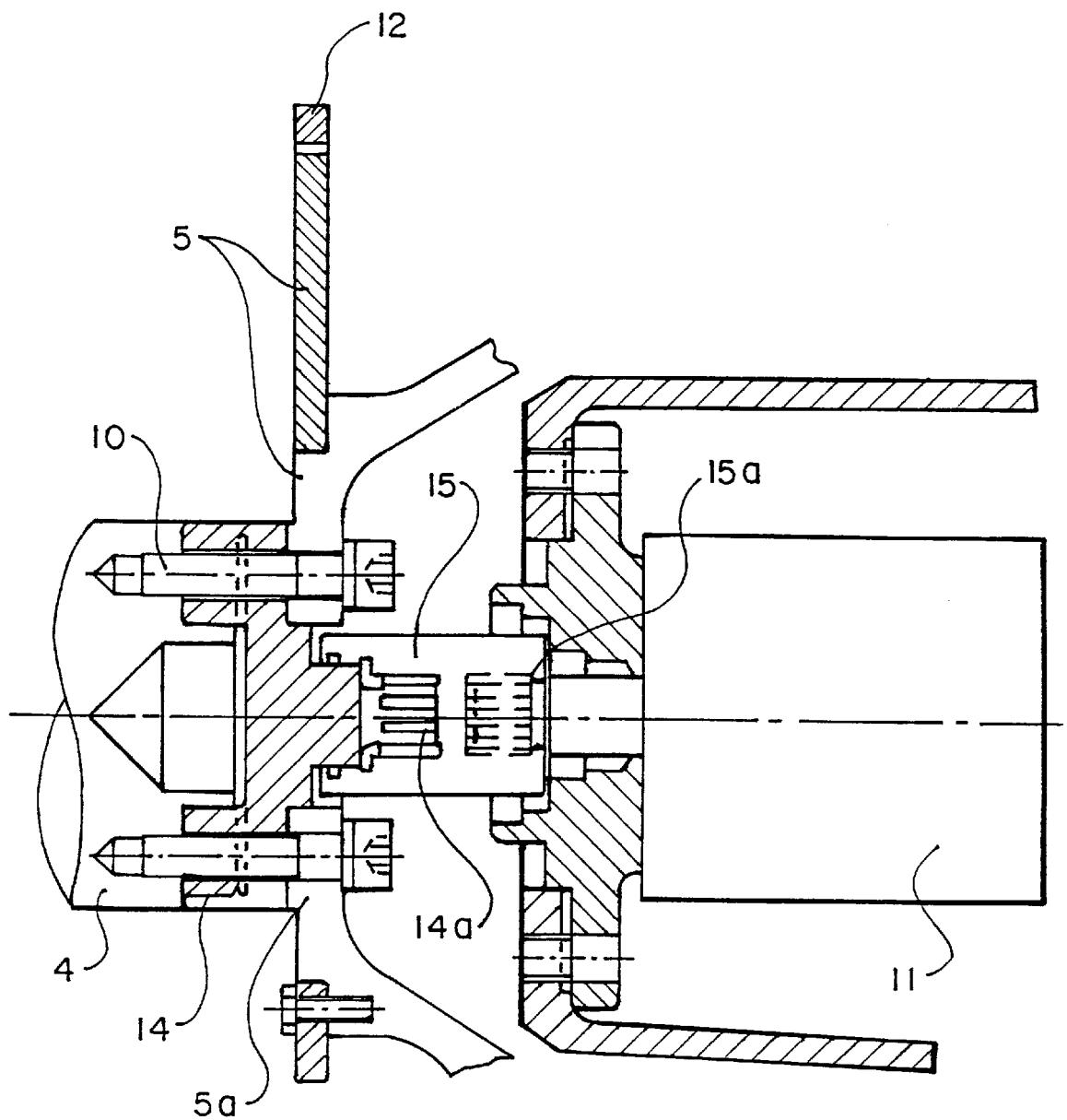
FIG. 2 is a diagrammatic cross-sectional illustration of an alternative connection of the rotor of the electrical machine to a rotatable shaft of an internal combustion engine.

FIG. 2 shows an alternative embodiment of the connection of the rotor 5 and the pump unit 11, to the crankshaft 4 of the internal combustion engine. The drive flange 5a of the rotor 5 is screwed to the crankshaft by way of an adapter 14. The drive flange 5a is provided with an asymmetrical hole pattern which determines a defined angular position of the rotor 5 in relation to the crankshaft 4.

That side of the adapter 14 remote from the internal combustion engine is provided with a spline 14a on which an internally splined intermediate shaft 15 is received. The intermediate shaft 15 connects the pump unit 11 to the crankshaft 4 by way of a further spline 15a so that the pump unit 11 cannot turn relative to the crankshaft 4. The splines 14a, 15a are designed to allow a certain amount of play so that vibrations and positional tolerances of the crankshaft 4 are accommodated and thus not transmitted to the pump unit 11.

Having described presently preferred embodiments of the invention, it is understood that it may be otherwise embodied within the scope of the appended claims and equivalents thereto.

We claim:

1. An electrical machine comprising:
   a stator adapted to be attached to a mechanical unit having a rotary shaft;
   a rotor adapted to be attached to the rotary shaft of the unit for rotation relative to said stator; and
   a means for releasably securing said rotor relative to said stator prior to the attachment of said rotor to the rotary shaft of the unit.

2. An electrical machine according to claim 1, wherein the means for releasably securing the rotor comprises at least one guide element for securing the rotor against radial movement relative to the stator.

3. An electrical machine according to claim 2, wherein the guide element comprises a shoulder.

4. An electrical machine according to claim 3, wherein the shoulder is provided with an inclined portion for guiding the rotor onto the shoulder.

5. An electrical machine according to claim 1, wherein the means for releasably securing the position of the rotor comprises at least one securing element for determining the rotational position of the rotor relative to the stator.

6. An electrical machine according to claim 1, wherein a housing of the electrical machine is connected to the stator and includes a flange for mounting the housing.

7. An electrical machine according to claim 1, wherein the rotor is provided with a drive flange for transmitting rotary motion.

8. An electrical machine according to claim 7, wherein the drive flange is adapted to secure the rotor to a crankshaft of an internal combustion engine.

9. An electrical machine according to claim 1, wherein the stator of the electrical machine is provided with at least one passage for fluid coolant.

10. An electrical machine comprising a stator and a rotor rotatable about an axis of rotation relative to the stator, having no bearing elements for rotatably mounting the rotor relative to the stator or for defining the axis of rotation of the rotor, and including means for releasably securing the rotor in position relative to the stator, wherein the means for releasably securing the rotor comprises at least one guide element for securing the rotor against radial movement relative to the stator, and wherein the guide element comprises a shoulder, and wherein the shoulder is provided with an inclined portion for guiding the rotor onto the shoulder.

11. An electrical machine comprising a stator and a rotor rotatable about an axis of rotation relative to the stator, having no bearing elements for rotatably mounting the rotor relative to the stator or for defining the axis of rotation of the rotor, and including means for releasably securing the rotor in position relative to the stator, wherein the means for releasably securing the rotor comprises at least one securing element for securing the rotor against axial movement relative to the stator.

12. An electrical machine according to claim 11, wherein the securing element comprises a securing screw.

13. An electrical machine according to claim 12 and including a flange for securing the rotor against axial movement relative to the stator.

14. An electrical machine comprising a stator and a rotor rotatable about an axis of rotation relative to the stator, having no bearing elements for rotatably mounting the rotor relative to the stator or for defining the axis of rotation of the rotor, and including means for releasably securing the rotor in position relative to the stator, wherein the rotor is provided with a drive flange for transmitting rotary motion, and wherein the drive flange is provided with means for determining the angular position of the rotor relative to a source of rotary motion.

15. An electrical machine comprising a stator and a rotor rotatable about an axis of rotation relative to the stator, having no bearing elements for rotatably mounting the rotor relative to the stator or for defining the axis of rotation of the rotor, and including means for releasably securing the rotor in position relative to the stator, wherein the rotor is provided with a drive flange for transmitting rotary motion, and wherein the drive flange is provided with an asymmetrical hole pattern for securing the drive flange to a source of rotary motion.

16. An electrical machine comprising a stator and a rotor rotatable about an axis of rotation relative to the stator, having no bearing elements for rotatably mounting the rotor relative to the stator or for defining the axis of rotation of the rotor, and including means for releasably securing the rotor in position relative to the stator, wherein the rotor is adapted to form a flywheel of an internal combustion engine.

17. An electrical machine comprising a stator and a rotor rotatable about an axis of rotation relative to the stator, having no bearing elements for rotatably mounting the rotor relative to the stator or for defining the axis of rotation of the rotor, and including means for releasably securing the rotor in position relative to the stator, wherein a ring gear is provided on the rotor for meshing with a starter motor of an internal combustion engine.

18. An electrical machine comprising a stator and a rotor rotatable about an axis of rotation relative to the stator, having no bearing elements for rotatably mounting the rotor relative to the stator or for defining the axis of rotation of the rotor, and including means for releasably securing the rotor in position relative to the stator, wherein a pump unit is located within a housing of the electrical machine.

19. An electrical machine according to claim 18, wherein the housing of the electrical machine is constructed such that a drive flange of the rotor is accessible after removal of the pump unit.

20. A method for mounting an electrical machine on a unit, the electrical machine comprising a stator and a rotor rotatable about an axis of rotation relative to the stator, having no bearing elements for rotatably mounting the rotor relative to the stator or for defining the axis of rotation of the rotor, the method comprising the steps of:
   (a) releasably securing the rotor relative to the stator;
   (b) rigidly securing the stator to the unit;
   (c) connecting the rotor to a rotatable shaft of the unit;
   (d) releasing the rotor relative to the stator; and
   (e) securing the rotor to the rotatable shaft of the unit for use of the electrical machine.

21. A method according to claim 20 and including the step of rotating the rotatable shaft of the unit to a predetermined position prior to mounting the electrical machine.

22. A method according to claim 20, wherein the stator is secured to the unit by way of a housing for the electrical machine.

* * * * *